US008981988B2

(12) United States Patent (10) Patent No.: US 8,981,988 B2
Kojima et al. (45) Date of Patent: Mar. 17, 2015

(54) RADAR SYSTEM, TRANSPONDER DEVICE, METHOD FOR RADAR PROCESSING AND COMPUTER READABLE MEDIA

(71) Applicant: Furuno Electric Co., Ltd., Nishinomiya, Hyogo-Pref. (JP)

(72) Inventors: Tatsuya Kojima, Nishinomiya (JP); Jun Yamabayashi, Nishinomiya (JP)

(73) Assignee: Furuno Electric Company Limited, Hyogo (JP)

( * ) Notice: Subject to any disclaimer, the term of this patent is extended or adjusted under 35 U.S.C. 154(b) by 283 days.

(21) Appl. No.: 13/739,680

(22) Filed: Jan. 11, 2013

(65) Prior Publication Data

US 2013/0181858 A1 Jul. 18, 2013

(30) Foreign Application Priority Data

Jan. 12, 2012 (JP) ................................ 2012-003963

(51) Int. Cl.
| | |
|---|---|
| *G01S 13/74* | (2006.01) |
| *G01S 13/78* | (2006.01) |
| *G01S 13/08* | (2006.01) |
| *G01S 13/00* | (2006.01) |
| *G01S 13/75* | (2006.01) |
| *G01S 13/76* | (2006.01) |
| *G01S 13/93* | (2006.01) |

(52) U.S. Cl.
CPC .............. *G01S 13/753* (2013.01); *G01S 13/767* (2013.01); *G01S 13/787* (2013.01); *G01S 13/9307* (2013.01)
USPC ................... 342/42; 342/43; 342/44; 342/45; 342/46; 342/51; 342/175

(58) Field of Classification Search
CPC .......................................... G01S 13/74–13/767
USPC .............................................. 342/42–51, 175
See application file for complete search history.

(56) References Cited

U.S. PATENT DOCUMENTS

| | | | | | |
|---|---|---|---|---|---|
| 3,964,024 | A | * | 6/1976 | Hutton et al. ............... | 340/10.34 |
| 3,969,725 | A | * | 7/1976 | Couvillon et al. ........... | 342/47 |
| 4,087,791 | A | * | 5/1978 | Lemberger ................. | 340/10.33 |
| 5,299,227 | A | * | 3/1994 | Rose ............................. | 342/45 |
| 7,999,723 | B2 | * | 8/2011 | Jung et al. ...................... | 342/22 |

(Continued)

FOREIGN PATENT DOCUMENTS

JP 04-361188 A 12/1992

*Primary Examiner* — Peter Bythrow
(74) *Attorney, Agent, or Firm* — Global IP Counselors, LLP

(57) ABSTRACT

A radar system is provided. The system includes a radar transceiving device equipped in a movable body and for transmitting an electromagnetic wave at a first frequency, and a transponder device arranged in a beacon and for transmitting a response wave upon receiving the electromagnetic wave. The transponder device includes a response wave transmitting module for transmitting, when a radar classification of the radar transceiving device is a solid-state radar, a response wave at a second frequency different from the first frequency in response to receiving the transmitted electromagnetic wave. The radar transceiving device includes a transmitting module for transmitting the electromagnetic wave, a receiving module for receiving a radar echo at the first frequency and the response wave at the second frequency, and a display controlling module for displaying, on a predetermined radar display unit, locations of the beacon and another movable body existing around the movable body.

10 Claims, 12 Drawing Sheets

(56) References Cited

U.S. PATENT DOCUMENTS

| | | | |
|---|---|---|---|
| 2003/0142013 A1* | 7/2003 | Livingston | 342/175 |
| 2003/0179126 A1* | 9/2003 | Jablonski et al. | 342/22 |
| 2009/0079616 A1* | 3/2009 | Daum | 342/45 |
| 2010/0001899 A1* | 1/2010 | Holly et al. | 342/175 |
| 2012/0176265 A1* | 7/2012 | Smith | 342/22 |
| 2013/0181858 A1* | 7/2013 | Kojima et al. | 342/51 |

* cited by examiner

RADAR SYSTEM, TRANSPONDER DEVICE, METHOD FOR RADAR PROCESSING AND COMPUTER READABLE MEDIA

CROSS-REFERENCE TO RELATED APPLICATION(S)

The application claims priority under 35 U.S.C. §119 to Japanese Patent Application No. 2012-3963, which was filed on Jan. 12, 2011, the entire disclosure of which is hereby incorporated by reference.

TECHNICAL FIELD

The present invention relates to a radar system, such as a ship radar system capable of controlling to appropriately and efficiently display other movable bodies and/or transponder devices on a display unit when a solid-state radar is adopted in a radar transceiver. The present invention also relates to a transponder device, a method for radar processing, and a computer readable media, utilizing this technology.

BACKGROUND OF THE INVENTION

Conventionally, surface ships are required to accurately acquire locations of the ship and other ships when traveling on major routes close to narrow water channels or land (or shore). Therefore, radar transceivers are equipped in the ships, while route buoys containing radar beacons (hereinafter, referred to as "the racon") are distributed over the major routes.

FIG. 11 is a schematic diagram illustrating a conventional radar system. As shown in FIG. 11, the radar transceiver transmits a radar wave around the ship, and receives and processes a radar reflection wave (hereinafter, referred to as "the radar echo") which is produced by the radar wave reflecting on land and/or another ship. The radar transceiver receives and processes a racon response wave which is transmitted from the racon at the same frequency as the radar wave received by the racon. Then, the radar transceiver controls, using the received racon response waves and radar echoes, to display lands, other ships, and racons on a PPI (Plan Position Indicator) screen, centering the location of the ship, as shown in FIG. 12A. JP1992-0361188A discloses one technology relevant to the above display control.

In JP04-361188A, a radar operator views the PPI screen to find out locations of the route buoys amongst other ships displayed on the PPI screen, thereby the operator can find out the location of his/her ship even in a congested ocean space.

Here, it is common to use a radar transceiver which adopted a magnetron radar. The radar transceiver transmits a radar wave at a transmission frequency determined by a magnetron oscillator. The racon which received the radar wave transmits a racon response wave at the same frequency as this radar wave, where the racon response wave is produced by modulating (compressing) a pulse for identifying a racon located in the same ocean space (hereinafter, referred to as "the identification pulse"). Thus, the radar transceiver can receive and process without discriminating between the radar echo and the racon response wave, and can display a Morse-type code indicating the racon (hereinafter, referred to as "the Morse code") as well as land(s) and other ship(s) on the PPI screen.

In the meantime, if the above radar transceiver adopts a pulse compression radar and not the magnetron radar, the radar transceiver applies the pulse compression also to the identification pulse contained in the racon response wave. For this reason, the displayed Morse code indicating the racon is elongated in distance directions on the PPI screen, causing a problem that the Morse code is collapsed.

Specifically, the pulse compression radar transmits the radar wave containing a transmission pulse of a long time width (several microseconds to tens of microseconds) compared to the magnetron radar, and applies, to the received signal, matched filter processing (hereinafter, referred to as "the MF processing") corresponding to the transmission pulse. Thus, the pulse width can be compressed and a signal to noise (S/N) ratio can be improved.

In this case, the radar transceiver which adopted the pulse compression radar applies the MF processing to the identification pulse contained in the racon response wave. However, since the racon response wave is a sine wave with a single frequency of which a frequency is not modulated, if the MF processing is applied to the identification pulse, the identification pulse is not pulse-compressed. Therefore, the Morse code displayed on the PPI screen is adversely elongated in the distance directions (both in a shorter distance direction and a longer distance direction), resulting in the Morse code being collapsed (see FIG. 12B).

If the Morse code is elongated in the shorter distance direction, the radar operator misrecognizes that a racon exists at an end of the displayed Morse code on the shorter distance side, and he/she misidentifies the location of the racon. In addition, another problem that other ship(s) which should originally be visible by the radar operator are hidden by the Morse code may be caused due to the elongation and collapse of the Morse code.

Therefore, when the radar transceiver adopts the pulse compression radar, it is very important to control an appropriate display of other ships and the racons on the PPI screen. The same can be said when adopting a solid-state radar other than the pulse compression radar, or when applying the above technology to transponder devices other than racons.

SUMMARY OF THE INVENTION

The present invention is made in view of the above situation, and it provides a radar system capable of controlling to appropriately and efficiently display other movable bodies and transponder devices on a display unit when a radar transceiver adopts a solid-state radar, and provides a transponder device, a method for radar processing, and a computer readable media.

According to an aspect of the invention, a radar system is provided. The radar system includes a radar transceiving device equipped in a movable body and for transmitting an electromagnetic wave at a first frequency, and a transponder device arranged in a beacon and for transmitting a response wave upon receiving the electromagnetic wave at the first frequency. The transponder device includes a response wave transmitting module for transmitting, when a radar classification of the radar transceiving device is a solid-state radar, a response wave at a second frequency different from the first frequency in response to receiving the electromagnetic wave transmitted from the radar transceiving device. The radar transceiving device includes a transmitting module for transmitting the electromagnetic wave at the first frequency, a receiving module for receiving a radar echo at the first frequency and the response wave at the second frequency, and a display controlling module for controlling to display, on a predetermined radar display unit, locations of at least the beacon and another movable body existing around the movable body based on the radar echo and the response wave.

The response wave transmitting module may include a determining module for determining, when receiving the electromagnetic wave transmitted from the radar transceiving device, whether the radar classification of the radar transceiving device is the solid-state radar based on at least one of a pulse width and the frequency of the electromagnetic wave.

The response wave transmitter may further include a transmission frequency setting module for setting on a predetermined transceiver, when the radar classification of the radar transceiving device is determined to be the solid-state radar by the determining module, the second frequency shifted from the first frequency by a predetermined frequency. The response wave transmitter may also include a response waveform generating module for generating a response waveform obtained by modulating a predetermined signal series using a predetermined modulation scheme, and outputting the response waveform to the transceiver. The response wave transmitter may also include a transmission trigger generating module for generating a transmission trigger of the response waveform after a predetermined period of time from a falling edge or a rising edge of a radar pulse contained in the electromagnetic wave and outputting the transmission trigger to the transceiver. The transceiver may frequency-convert the signal with the response waveform into the second frequency, and output the converted response waveform to a predetermined antenna unit at a timing corresponding to the generated transmission trigger.

The predetermined signal series may indicate that the response wave is from the transponder device.

The response waveform may be generated by modulating a signal series that is the predetermined signal series added with arbitrary information, the predetermined signal series indicating that the response wave is from the transponder device.

The display controlling module may control to display a signal series contained in the response wave received by the receiving module in the form of a hollow frame.

The response wave at the first frequency may be transmitted when the radar classification of the radar transceiving device is not the solid-state radar.

According to another aspect of the invention, a transponder device arranged in a beacon and for transmitting a response wave upon receiving an electromagnetic wave at a first frequency is provided. The transponder device includes a determining module for determining, when receiving the electromagnetic wave at the first frequency, whether the electromagnetic wave at the first frequency is transmitted from a solid-state radar, and a response wave transmitting module for transmitting a response wave at a second frequency different from the first frequency when the electromagnetic wave at the first frequency is determined to be transmitted from the solid-state radar by the determining module.

According to another aspect of the invention, a method for radar processing in a radar system is provided. The radar system includes a radar transceiving device equipped in a movable body and for transmitting an electromagnetic wave at a first frequency, and a transponder device arranged in a beacon and for transmitting a response wave upon receiving the electromagnetic wave at the first frequency. The method includes transmitting the electromagnetic wave at the first frequency by the radar transceiving device. The method includes transmitting by the transponder device, when a radar classification of the radar transceiving device is a solid-state radar, a response wave at a second frequency different from the first frequency in response to receiving the electromagnetic wave transmitted from the radar transceiving device. The method includes receiving a radar echo at the first frequency and the response wave at the second frequency by the radar transceiving device. The method includes controlling to display, on a predetermined radar display unit, locations of at least the beacon and another movable body existing around the movable body, based on the radar echo and the response wave.

According to another aspect of the invention, computer readable media configured to store a computer executable program in a non-transitory manner is provided. The computer readable media, upon execution by a processor of a computer, causes the computer to perform radar processing on a radar transceiving device equipped in a movable body and for transmitting an electromagnetic wave at a first frequency, and on a transponder device arranged in a beacon and for transmitting a response wave upon receiving the electromagnetic wave at the first frequency, according to a method. The method includes causing a computer configuring the transponder device to transmit, when a radar classification of the radar transceiving device is a solid-state radar, a response wave at a second frequency different from the first frequency in response to receiving the electromagnetic wave transmitted from the radar transceiving device, and causing a computer configuring the radar transceiving device to transmit the electromagnetic wave at the first frequency, receive a radar echo at the first frequency and the response wave at the second frequency, and control to display, on a predetermined radar display unit, locations of at least the beacon and another movable body existing around the movable body, based on the radar echo and the response wave.

According to the above aspects of the invention, in the case where the radar classification of the radar transceiving device is the solid-state radar, when the radar transceiving device transmits the electromagnetic wave at the first frequency and the transponder device receives the electromagnetic wave transmitted from the radar transceiving device, the radar transceiving device transmits the response wave at the second frequency different from the first frequency, the radar transceiving device receives the radar echo at the first frequency and the response wave at the second frequency, and it controls to display locations of at least a beacon and another movable body existing around the movable body based on the received radar echo and response wave. Therefore, when the solid-state radar is adopted in the radar transceiver, the other movable body and the transponder device can be controlled to appropriately and efficiently be displayed on the display unit.

BRIEF DESCRIPTION OF THE DRAWINGS

The present disclosure is illustrated by way of example and not by way of limitation in the figures of the accompanying drawings, in which the like reference numerals indicate like elements and in which.

DETAILED DESCRIPTION

Below, several suitable embodiments of a radar system, a transponder device, a method for radar processing, and a radar processing program according to the present invention are described in detail with reference to the accompanying drawings. In the embodiments, the present invention is applied to a ship radar system that uses a pulse compression radar as one example of a solid-state radar, and displays locations of surface ships on a PPI screen.

Ship Radar System

Figure 1:
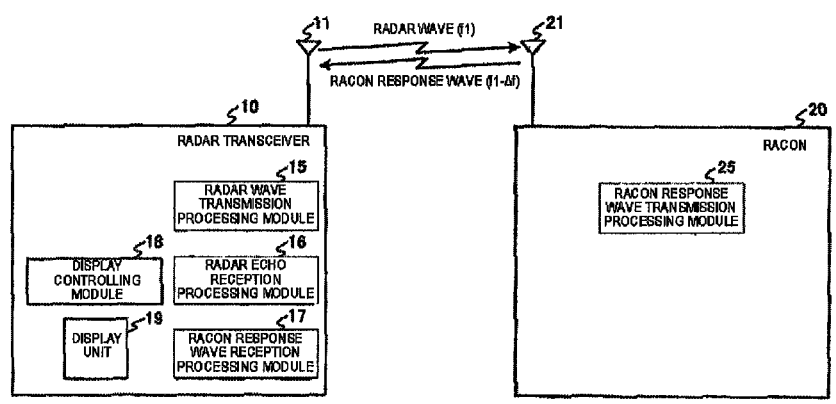
FIG. 1 is a schematic diagram illustrating a ship radar system according to one embodiment of the invention.

First, the ship radar system according to one embodiment of the invention is described. FIG. 1 is a schematic diagram illustrating the ship radar system according to this embodiment. The radar transceiver 10 is a pulse compression radar in this embodiment.

In the ship radar system shown in FIG. 1, the radar transceiver 10 equipped in a ship transmits radar waves at a frequency f1, throughout all directions around the ship (360°). The radar transceiver 10 receives a radar echo at the same frequency f1 which is produced by the radar wave reflecting on another ship or land, applies MF processing to a pulse contained in the radar echo, and displays the other ship or the land on a PPI screen of a display unit 19.

When a racon 20 receives the radar wave at the frequency f1, the racon 20 transmits a racon response wave at a different frequency from the frequency f1 (e.g., f1-Δf). The radar transceiver 10 does not apply MF processing to a racon identification code contained in the racon response wave received at the frequency (f1-Δf), but it applies a demodulation processing corresponding to the modulation applied by the racon 20 thereon so as to acquire location information of the racon 20.

This is because that the racon response wave is a sine wave with a single frequency which is not modulated, and thus, if the racon identification code is applied to the MF processing, the racon identification code will not be pulse-compressed, but will extend in distance directions (both in a shorter distance direction and a longer distance direction), and the racon identification code will be collapsed. In this embodiment, the racon identification code of the racon 20 is displayed on the PPI screen of the display unit 19.

Thus, the radar transceiver 10 is configured to treat the processing applied to the radar echoes which is produced by the radar waves reflecting on land and other ships, differently from the processing applied to the racon response waves transmitted from the racons 20, and, in addition, the radar transceiver 10 is configured not to apply the MF processing to the racon identification codes. Therefore, the radar transceiver 10 can control to appropriately and efficiently display land, other ships, and the racons on the PPI screen of the display unit 19.

Although it is described later in detail, the racon 20 determines whether a radar classification of the radar transceiver 10 is either a pulse compression radar or a magnetron radar based on the pulse width and the frequency of the pulse contained in the received radar wave (hereinafter, referred to as "the radar pulse"). Then, if it is the magnetron radar, the racon 20 transmits a racon response wave at the frequency f1. Thus, the racon is compatible to the radar transceivers which adopted the existing magnetron radars.

Next, configurations of the radar transceiver 10 and the racon 20 are briefly described. As shown in FIG. 1, the radar transceiver 10 includes a radar wave transmission processing module 15, a radar echo reception processing module 16, a racon response wave reception processing module 17, a display controlling module 18, and the display unit 19.

The radar wave transmission processing module 15 generates a transmission waveform of the radar pulse comprised of a frequency modulated pulse, up-converts it into an RF (Radio Frequency) band, amplifies it, and transmits it through an antenna unit 11.

The radar echo reception processing module 16 applies reception processing to the radar echo received through the antenna unit 11. The radar echo reception processing module 16 also applies a pulse compression to the received radar echo, and outputs it to the display controlling module 18.

The racon response wave reception processing module 17 applies reception processing to the racon response wave received through the antenna unit 11. The racon response wave reception processing module 17 demodulates the received racon response wave using a predetermined demodulation scheme, and then outputs it to the display controlling module 18.

The display controlling module 18 controls the display unit 19 to display using the outputs from the radar echo reception processing module 16 and the racon response wave reception processing module 17. The display controlling module 18 draws the outputs of the radar echo reception processing module 16 as a radar image on the display unit 19, and also draws racon mark(s) indicating location(s) of the racon(s) based on the outputs of the racon response wave reception processing module 17 so as to superimpose the racon mark(s) on the radar image.

The display unit 19 displays the radar image and the racon mark(s). As for the display unit 19, a PPI scope for two-dimensionally displaying locations of objects by a scanning line revolving within a circular display area may be used.

The racon 20 includes a racon response wave transmission processing module 25. The racon response wave transmission processing module 25, upon receiving the radar wave at the frequency f1, applies transmission processing to a racon response wave at the frequency (f1-Δf) if the transmitting source of the radar wave is a pulse compression radar, and, on the other hand, applies transmission processing to a racon response wave at the frequency f1 if the transmitting source is a magnetron radar. The determination of the transmitting source can be made based on the pulse width and the frequency of the radar pulse.

Figure 2:
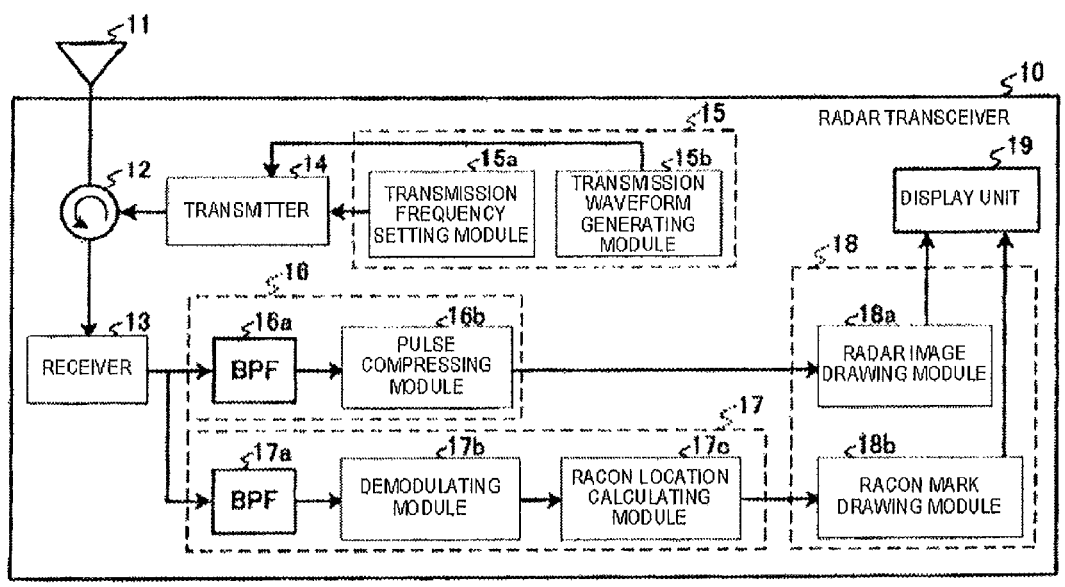
FIG. 2 is a block diagram showing a configuration of the radar transceiver shown in FIG. 1.

Next, a configuration of the radar transceiver 10 shown in FIG. 1 is described in detail. FIG. 2 is a block diagram showing a detailed configuration of the radar transceiver 10. Here, the radar transceiver 10 is implemented using an ASIC or an FPGA for easier explanation.

As shown in FIG. 2, the radar transceiver 10 includes the antenna unit 11, a circulator 12, a receiver 13, a transmitter 14, a transmission frequency setting module 15a, a transmission waveform generating module 15b, and a band pass filter (hereinafter, referred to as "the BPF") 16a, a pulse compressing module 16b, a BPF 17a, a demodulating module 17b, a racon location calculating module 17c, a radar image drawing module 18a, a racon mark drawing module 18b, and the display unit 19. Note that the transmission frequency setting module 15a and the transmission waveform generating module 15b correspond to the radar wave transmission processing module 15 shown in FIG. 1, and the BPF 16a and the pulse compressing module 16b correspond to the radar echo reception processing module 16 shown in FIG. 1, and the BPF 17a, the demodulating module 17b, and the racon location calculating module 17c correspond to the racon response wave reception processing module 17 shown in FIG. 1, and the radar image drawing module 18a and the racon mark drawing module 18b correspond to the display controlling module 18 shown in FIG. 1.

The antenna unit 11 transmits the radar wave outputted from the circulator 12, and outputs the received radar echo and racon response wave to the circulator 12 as antenna reception signals, respectively. Thus, the antenna unit 11 is used for both reception and transmission. While rotating, the antenna unit 11 transmits the radar waves throughout all directions (360°) around the antenna unit 11, and receives the radar echoes and the racon response waves from all directions (360°).

The circulator 12 is a three-port circulator connected with the transmitter 14, the antenna unit 11, and the receiver 13. The circulator 12 transmits the radar wave outputted from the transmitter 14 to the antenna unit 11, and transmits the antenna reception signal outputted from the antenna unit 11 to the receiver 13.

The receiver 13 amplifies the antenna reception signal outputted from the antenna unit 11, and then outputs the radar echo and/or the racon response wave to the radar echo reception processing module 16 and/or the racon response wave reception processing module 17, respectively.

The transmitter 14 up-converts the signal with the transmission waveform generated by the transmission waveform generating module 15b to the RF band set by the transmission frequency setting module 15a to amplify the waveform, and then outputs it to the circulator 12.

The transmission frequency setting module 15a sets the frequency f1 of the radar wave to be transmitted from the radar transceiver 10. Normally, a predetermined fixed value is used for the frequency f1, but it may be changed by a radar operator. The transmission frequency setting module 15a outputs the set frequency f1 to the transmitter 14.

The transmission waveform generating module 15b generates the transmission waveform of the radar wave to be transmitted by the radar transceiver 10. The transmission waveform generating module 15b generates the transmission waveform of which frequency is modulated or the like so as to perform the pulse compression to the radar echo, and outputs it to the transmitter 14.

The BPF 16a passes the frequency component f1 of the radar echo selectively among the antenna reception signals outputted from the receiver 13. The frequency component (f1-Δf) of the racon response wave is removed by the BPF 16a, and only the frequency component f1 of the radar echo is extracted. The BPF 16a outputs the extracted frequency component of the radar echo to the pulse compressing module 16b.

The pulse compressing module 16b applies the pulse compression to the frequency component of the radar echo outputted from the BPF 16a. Specifically, by applying the MF processing corresponding to the radar pulse contained in the radar wave to the pulse contained in the radar echo, the pulse width is compressed and a signal to noise ratio (S/N) is improved. The pulse compressing module 16b outputs the pulse-compressed radar echo to the display controlling module 18.

The BPF 17a passes the frequency component (f1-Δf) of the racon response wave selectively among the antenna reception signals outputted from the receiver 13. The frequency component f1 of the radar echo is removed by the BPF 17a, and only the frequency component (f1-Δf) of the racon response wave is extracted. The BPF 17a outputs the extracted frequency component of the racon response wave to the demodulating module 17b.

The demodulating module 17b demodulates the frequency component of the racon response wave outputted from the BPF 17a using the demodulation scheme corresponding to the modulation scheme of the racon response wave. The racon identification code contained in the racon response wave is extracted by this demodulation. The demodulating module 17b outputs the demodulated result to the racon location calculating module 17c.

The racon location calculating module 17c calculates a racon location based on the demodulation result of the demodulating module 17b. Specifically, the racon location calculating module 17c first determines whether the racon identification code is contained in the demodulation result of the demodulating module 17b.

If the racon identification code is contained, an elapsed time length from a time point of transmitting the radar wave from the antenna unit 11 to a time point of receiving the racon response wave by the antenna unit 11 is obtained, and a distance from the radar transceiver 10 to the racon 20 is calculated using the elapsed time length.

Moreover, the racon location calculating module 17c determines a relative azimuth of the racon 20 with respect to the radar transceiver 10 based on the rotation angle of the antenna unit 11 at the time of receiving the racon response wave by the antenna unit 11. Here, since the racon 20 transmits a racon response wave every time it receives a radar wave, if a radar wave is transmitted for a plurality of times, the radar transceiver 10 will receive a radar response wave for the same number of times. In this case, the rotation angle of the antenna unit 11 at the time of receiving the racon response wave with the largest reception power among two or more racon response waves which are received while the antenna unit 11 rotates once (360°) is used as the relative azimuth of the racon 20 with respect to the radar transceiver 10. The racon location calculating module 17c outputs, to the display controlling module 18, the distance from the radar transceiver 10 to the racon 20 and the relative azimuth of the racon 20 with respect to the radar transceiver 10 as a racon location.

The radar image drawing module 18a draws a radar image in the display unit 19 based on the radar echo(es) outputted from the pulse compressing module 16b. Each radar echo outputted from the pulse compressing module 16b is a signal in an Rθ coordinate system indicating a distance R from the radar transceiver 10 to land or another ship which reflected the radar wave, and a relative azimuth θ of the land or the other ship which reflected the radar wave with respect to the radar transceiver 10. The radar image drawing module 18a converts the signal in the Rθ coordinate system into a signal in an X-Y coordinate system, transmits it to the display unit 19, and draws the radar image on display unit 19.

The racon mark drawing module 18b performs processing of drawing to superimpose the racon mark at a predetermined location on the radar image based on the racon location outputted from the racon location calculating module 17c.

Figure 3:
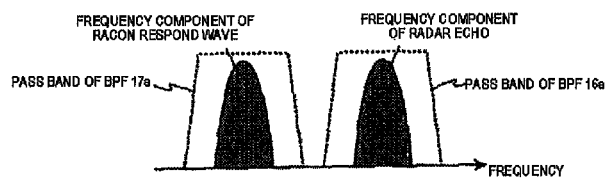
FIG. 3 is a diagram illustrating a processing concept of a BPF shown in FIG. 2.

Next, processing concepts of the BPFs 16a and 17a are described. FIG. 3 is a diagram illustrating the processing concepts of the BPFs 16a and 17a shown in FIG. 2. Here, the frequency component of the radar echo and the frequency component of the racon response wave have a distinguishable sufficient difference (e.g., 50 MHz).

As shown in FIG. 3, the frequency components of both the radar echo and the racon response wave are contained in the antenna reception signal. The frequency component of the radar echo has a predetermined band width of which peak is at the frequency f1, and the frequency component of the racon response wave has a predetermined band width of which peak is at the frequency (f1-Δf).

The pass band of the BPF 16a is set to include the entire band width of the frequency component of the radar echo but not include the band width of the frequency component of the racon response wave. On the other hand, the pass band of the BPF 17a is set to include the entire band width of the frequency component of the racon response wave but not include the band width of the frequency component of the radar echo.

Thus, by setting the pass bands of the BPFs 16a and 17a, the antenna reception signal which passed the BPF 16a only contains the frequency component of the radar echo, and the antenna reception signal which passed the BPF 17a only contains the frequency component of the racon response wave.

Figure 4:
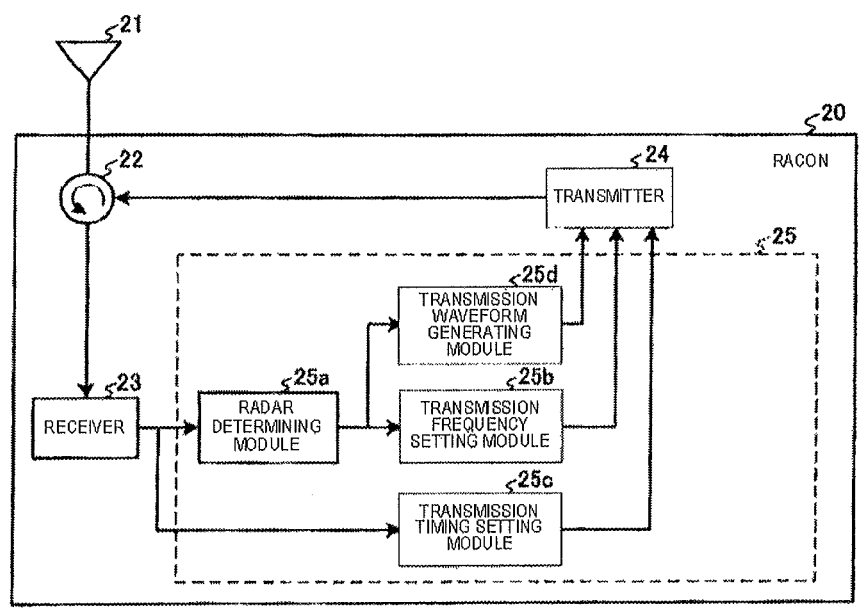
FIG. 4 is a block diagram showing a configuration of a racon shown in FIG. 1.

Next, the configuration of the racon 20 shown in FIG. 1 is described. FIG. 4 is a block diagram showing the configuration of the racon 20 shown in FIG. 1. As shown in FIG. 4, the racon 20 includes an antenna unit 21, a circulator 22, a receiver 23, a transmitter 24, a radar determining module 25a, a transmission frequency setting module 25b, a transmission timing setting module 25c, and a transmission waveform generating module 25d. The radar determining module 25a, the transmission frequency setting module 25b, the transmission timing setting module 25c, and the transmission waveform generating module 25d correspond to the racon response wave transmission processing module 25 shown in FIG. 1.

The antenna unit 21 outputs the received radar wave to the circulator 22, and then transmits the racon response wave outputted from the circulator 22. Thus, the antenna unit 21 is used for both reception and transmission.

The circulator 22 is a three-port circulator connected with the antenna unit 21, the receiver 23, and the transmitter 24. The radar wave outputted from the antenna unit 21 is transmitted to the receiver 23 and the racon response wave outputted from the transmitter 24 is transmitted to the antenna unit 21 through the circulator 22.

The receiver 23 amplifies the radar wave outputted from the antenna unit 21 and outputs it to the radar determining module 25a and further to the transmission timing setting module 25c in the racon response wave transmission processing module 25.

The transmitter 24 up-converts to amplify the signal with the transmission waveform generated by the transmission waveform generating module 25d to the RF band which is set by the transmission frequency setting module 25b, and outputs it to the circulator 22 at a timing corresponding to a transmission trigger which is set by the transmission timing setting module 25c.

The radar determining module 25a determines whether the radar transceiver 10 from which the radar wave is transmitted is the pulse compression radar, by using at least one of the pulse width and the frequency of the radar pulse contained in the radar wave outputted from the receiver 23. For example, when "the pulse width is 2 µs or more", or when "the frequency is modulated", the radar wave can be determined to be from the pulse compression radar.

The transmission frequency setting module 25b sets the frequency of the racon response wave. Specifically, when the radar wave received by the transmission frequency setting module 25b is from the pulse compression radar, the transmission frequency setting module 25b sets the different frequency from that of the received radar wave as the frequency of the racon response wave. For example, the frequency of the racon response wave is set to be lower than the frequency f1 of the radar wave by 50 MHz. On the other hand, when the radar wave received by the transmission frequency setting module 25b is from the magnetron radar, the frequency of the racon response wave is set to be equal to the frequency of the received radar wave. The transmission frequency setting module 25b outputs the frequency of the set racon response wave to the transmitter 24.

The transmission timing setting module 25c detects the edge in falling or rising of the radar pulse contained in the received radar wave, generates the transmission trigger of the racon response wave after a predetermined period of time from the detected edge, and outputs it to the transmitter 24.

The transmission waveform generating module 25d generates the transmission waveform of the racon response wave. When the radar wave received by the transmission waveform generating module 25d is from the pulse compression radar, the transmission waveform generating module 25d generates the racon response waveform as the transmission waveform, the racon response waveform being obtained by modulating, using the predetermined scheme, a predetermined signal series (racon identification code) indicating that it is the racon response wave. The ASK (Amplitude Shift Keying) modulation or the FSK (Frequency Shift Keying) modulation can be used in the modulation. On the other hand, when the radar wave received by the transmission waveform generating module 25d is from the magnetron radar, the transmission waveform generating module 25d generates a single frequency waveform obtained by ASK modulating an identification pulse, as a transmission waveform.

Figure 5:
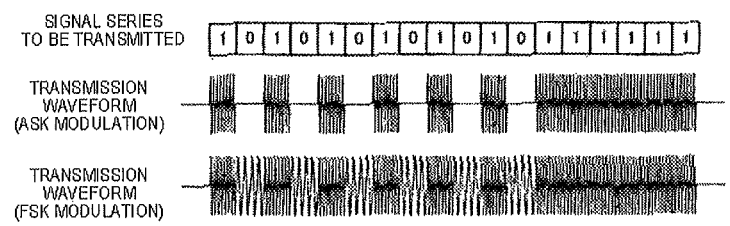
FIG. 5 is a view showing examples of a transmission waveform transmitted from a transmitter shown in FIG. 4.

FIG. 5 is a view showing examples of a transmission waveform transmitted from the transmitter 24 shown in FIG. 4. As shown in FIG. 5, the signal series to be transmitted is a binary code sequence of "0" and "1" indicating the racon identification code. When the binary code sequence is ASK modulated, a transmission waveform having an amplitude "0" within the range corresponding to "0" in the binary code sequence and a predetermined amplitude within the range corresponding to "1" in the binary code sequence is obtained. On the other hand, when the signal series of the binary code sequence is FSK modulated, a transmission waveform having a different pulse frequency between the range corresponding to "0" in the binary code sequence and the range corresponding to "1" in the binary code sequence is obtained.

Therefore, to extract the racon identification code from the transmission waveform acquired through the ASK modulation, the difference in amplitude is to be detected, and to extract the racon identification code from the transmission waveform acquired through the FSK modulation, the difference in frequency is to be detected.

Next, a procedure in a case of realizing the processing of the radar transceiver 10 shown in FIG. 1 by software is described. Here, all the processing of the radar wave transmission processing module 15, the radar echo reception processing module 16, the racon response wave reception processing module 17, and the display controlling module 18 shown in FIG. 2 are performed in programs on a CPU. Therefore, the programs corresponding to the radar wave transmission processing module 15, the radar echo reception processing module 16, the racon response wave reception processing module 17, and the display controlling module 18 are stored in the radar transceiver 10 on a flash memory or a ROM. These programs are read and executed by the CPU.

After the radar transceiver 10 generates the radar wave including the radar pulse and transmits it from the antenna unit 11, it performs radar echo reception processing and racon response wave reception processing based on the antenna reception signal received by the antenna unit 11.

Figure 6:
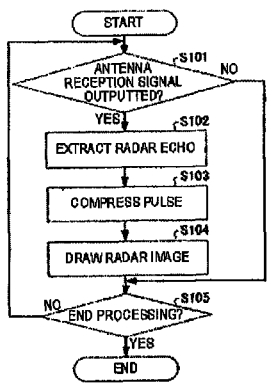
FIG. 6 is a flowchart showing a processing procedure of radar echo reception processing.

FIG. 6 is a flowchart showing the procedure of the radar echo reception processing. First, the radar echo reception processing module 16 determines whether the antenna reception signal is outputted from the antenna unit 11 (Step S101). If the antenna reception signal is not outputted from the antenna unit 11 (Step S101: NO), the radar echo reception processing module 16 shifts to Step S105.

If the antenna reception signal is outputted from the antenna unit 11 (Step S101: YES), the radar echo reception processing module 16 extracts a radar echo from the antenna reception signal (Step S102), and performs, on the radar echo, MF processing corresponding to the radar pulse contained in the radar wave, so as to compress a pulse width and improve a signal to noise ratio (S/N) (Step S103). Then, a radar image is drawn on the display unit 19 by converting the radar echo of which pulse width is compressed into an XY coordinate system and then transmitting it to the display unit 19 (Step S104).

Moreover, the radar echo reception processing module 16 determines whether to end the above described processing (Step S105), and if proceeding the processing (Step S105: NO), it shifts to Step S101. Note that, in determining whether to end the processing, it can be determined depending on whether a predetermined period of time has passed since the transmission time point of the radar wave, etc.

Figure 7:
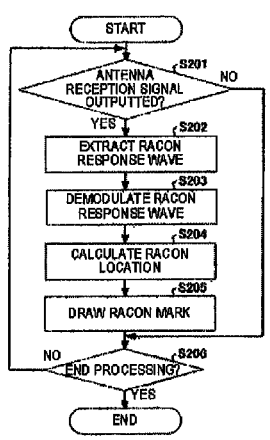
FIG. 7 is a flowchart showing a processing procedure of racon response wave reception processing.

FIG. 7 is a flowchart showing the procedure of the racon response wave reception processing. First, the racon response wave reception processing module 17 determines whether the antenna reception signal is outputted from the antenna unit 11 (Step S201). If the antenna reception signal is not outputted from the antenna unit 11 (Step S201: NO), the racon response wave reception processing module 17 shifts to Step S206.

If the antenna reception signal is outputted from the antenna unit 11 (Step S201: YES), the racon response wave reception processing module 17 extracts a racon response wave from the antenna reception signal (Step S202), applies a demodulation to the frequency component of the racon response wave using the demodulation scheme corresponding to the modulation scheme of the racon response wave (Step S203). By the demodulation, a racon identification code is extracted.

Then, a racon location is calculated (Step S204). Specifically, the distance to the racon 20 is calculated based on the elapsed time from the time point of transmitting the radar wave until the time point of receiving the racon response wave. Moreover, the relative azimuth of the racon 20 is determined based on the rotation angle of the antenna unit 11 when the racon response wave is detected. Based on the calculated distance and relative azimuth, a racon mark is drawn by being superimposed on the radar image at a predetermined location (Step S205).

Further, the racon response wave receiving module 17 determines whether to end the above described processing (Step S206), and if proceeding the processing (Step S206: NO), it shifts to Step S201. Note that, in determining whether to end the processing, it can be determined depending on whether a predetermined period of time has passed since the transmission time point of the radar wave, etc.

Figure 8:
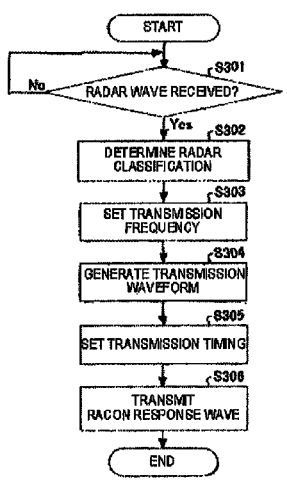
FIG. 8 is a flowchart showing a processing procedure of a racon shown in FIG. 1.

Next, a procedure in a case of realizing the processing of the racon 20 shown in FIG. 1 by software is described. FIG. 8 is a flowchart showing the procedure of the racon 20 shown in FIG. 1. Here, the processing of the racon response wave transmission processing module 25 shown in FIG. 4 is executed in a program on a CPU. Therefore, the program corresponding to the racon response wave transmission processing module 25 is stored in the racon 20 on a flash memory or a ROM. The program is read and executed by the CPU.

As shown in FIG. 8, the racon 20 determines whether the radar wave is received from the antenna unit 21 (Step S301), and if the radar wave is not received (Step S301: NO), it repeats Step S301.

On the other hand, if the radar wave is received (Step S301: YES), the radar classification of the radar transceiver 10 is determined by using at least one of the pulse width and the frequency of the radar pulse contained in the radar wave (Step S302).

As a result, the transmission frequency of the racon response wave is set according to the radar classification of the radar transceiver 10 (Step S303). Specifically, when the radar classification of the radar transceiver 10 is determined to be the pulse compression radar, the frequency (f1-Δf) is set to the frequency of the racon response wave, and when the radar classification is determined to be the magnetron radar, the frequency f1 is set as the frequency of the racon response wave.

Further, the transmission waveform of the racon response wave is generated according to the radar classification of the radar transceiver 10 (Step S304). Specifically, when the radar classification of the radar transceiver 10 is determined to be the pulse compression radar, the racon response waveform obtained by modulating, using the predetermined scheme, the racon identification code indicating that it is the racon response wave is generated as the transmission waveform, and when the radar classification is determined to be the magnetron radar, the single frequency waveform obtained by ASK modulating the identification pulse is generated as the transmission waveform.

Then, the edge in falling or rising of the radar pulse contained in the received radar wave is detected, and after the predetermined time period from the detected edge, the transmission trigger of the racon response wave is generated and outputted to the transmitter 24 (Step S305). The transmitter 24 amplifies the transmission waveform generated at Step S304 by up-converting it into the frequency set at Step S303, and transmits it at the transmission timing set at Step S305 (Step S306).

As described above, in this embodiment, the radar transceiver 10 performs the transmission processing of the radar wave at the frequency f1, when the racon 20 receives the radar wave, the radar transceiver 10 determines the radar classification of the radar transceiver, and when the radar classification is a solid-state radar, it applies the transmission processing to the racon response wave at the frequency (f1-Δf). Further, the radar transceiver 10 is configured to control to display locations of other ships, land, and route buoys existing around the ship, respectively, through pulse-compressing the pulses contained in the radar echo at the frequency f1 but not pulse-compressing the racon identification codes contained in the racon response waves at the frequency (f1-Δf). Thus, geographical feature, other ships which exist around the ship, and the locations of the racons 20 can be controlled to appropriately and efficiently be displayed on the PPI screen of the display unit. Especially, since the racon identification code is excluded from the processing target of pulse compression, such situation can be prevented that the racon identification code is expanded in the distance directions and collapses, and thus, the case where the other ship is hidden by the racon identification code can be prevented.

Moreover, since the reception processing of the radar echo and the reception processing of the racon response wave are independent from each other, they are applicable to various pulse compression radars regardless of the scheme of the pulse compression. Further, since the racon 20 transmits, when the radar classification of the radar transceiver 10 is the magnetron radar, the racon response wave at the same frequency as the radar wave similar to the conventional case, interoperability with the existing radar system can be secured.

Meanwhile, although, in this embodiment, the case where the racon 20 generates the transmission waveform by modulating the racon identification code is described; however, not limiting to this, the transmission waveform may be generated by modulating the racon identification code with an addition of arbitrary information thereafter.

Figure 9:
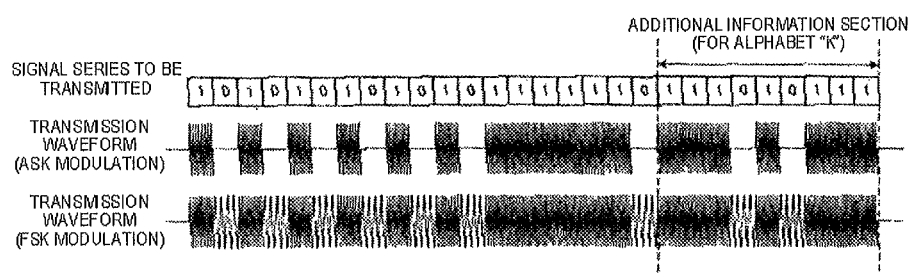
FIG. 9 is a view showing other examples of the transmission waveform transmitted from the transmitter shown in FIG. 4.

FIG. 9 is a view showing other examples of the transmission waveform transmitted from the transmitter 24 shown in FIG. 4. The signal series shown in FIG. 9 is the signal series shown in FIG. 4 added with the information corresponding to "K" of the alphabet as the additional information section. As above, even if the additional information section is added, a transmission waveform can be generated by performing the ASK modulation or the FSK modulation similar to the case of FIG. 4.

In this case, in the radar transceiver 10, alphabet information is extracted by the demodulating module 17b, and a pseudo-Morse code mark is generated by the racon mark drawing module 18b based on the alphabet extracted by demodulating module 17b, and the pseudo-Morse code mark is displayed by being superimposed on the radar image at the racon location calculated by the racon location calculating module 17c. By performing the above processing, arbitrary information can be applied to a racon response wave and can be displayed on a radar image.

Moreover, in this embodiment, the radar transceiver 10 receives a racon response wave at a different frequency from the radar echo and calculates the present location of the racon (the relative distance and azimuth from the radar of the ship) based on the received racon response wave, and therefore, a racon mark with different color and/or shape from the radar echo can be displayed.

Figure 10A:
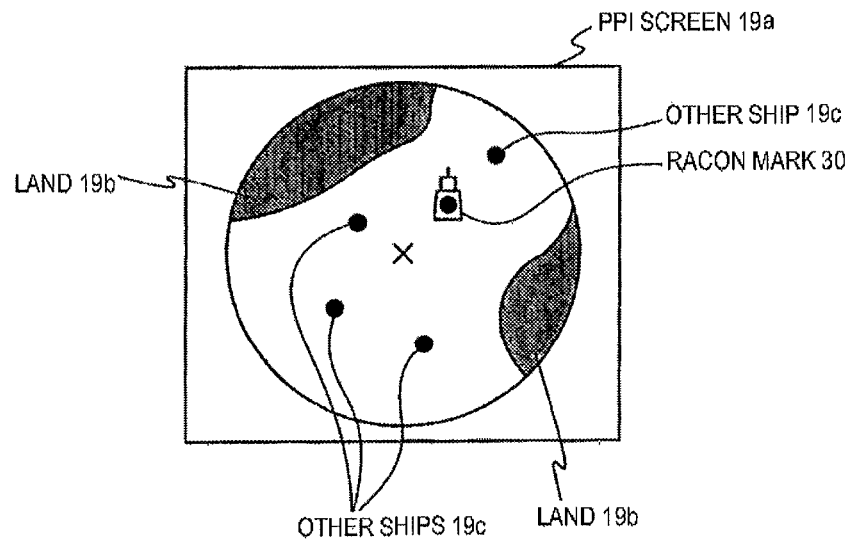
FIGS. 10A and 10B are views showing example indications of a display unit shown in FIG. 2.
Figure 10B:
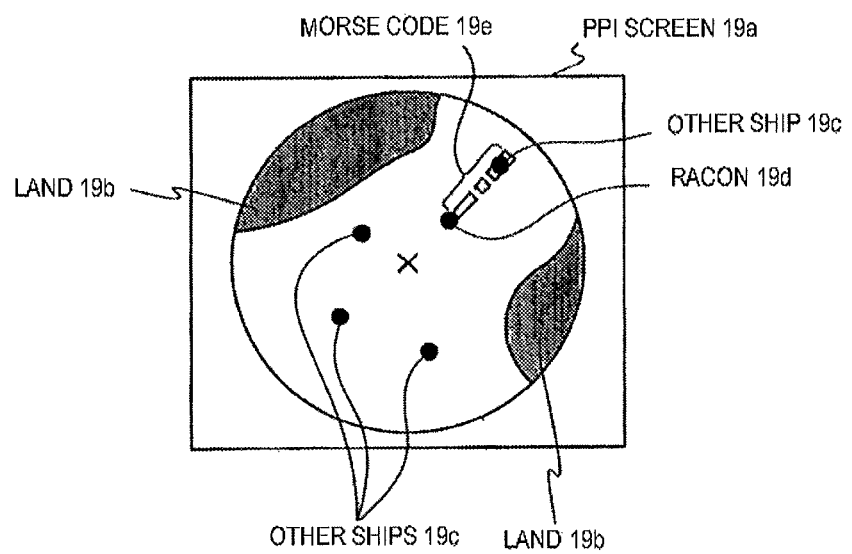
Figure 11:
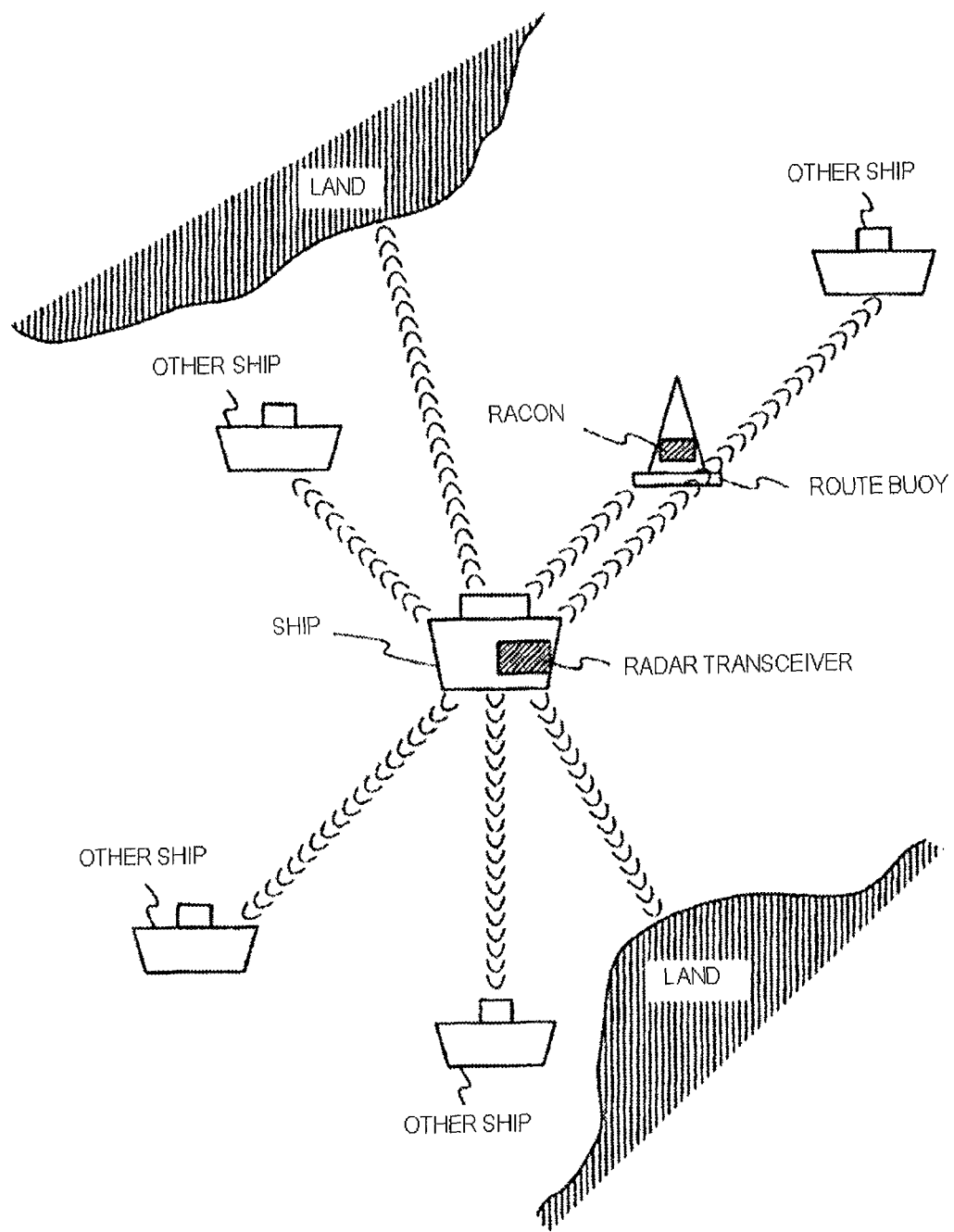
FIG. 11 is a diagram schematically illustrating a conventional radar system.
Figure 12A:
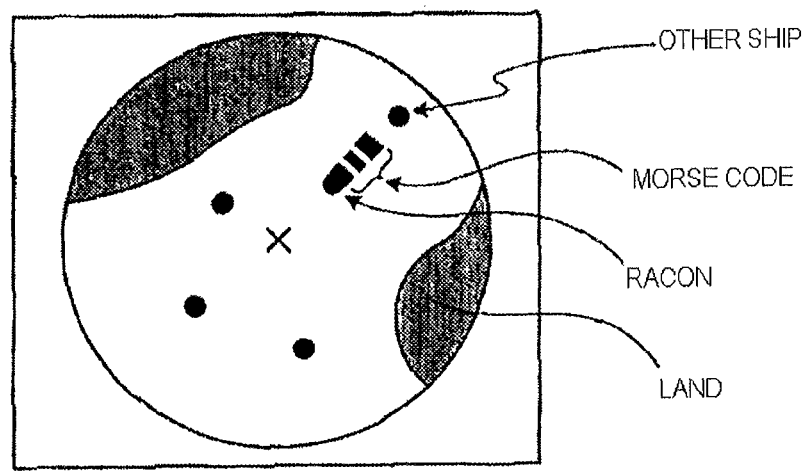
FIGS. 12A and 12B are diagrams illustrating problems of conventional technologies.
Figure 12B:
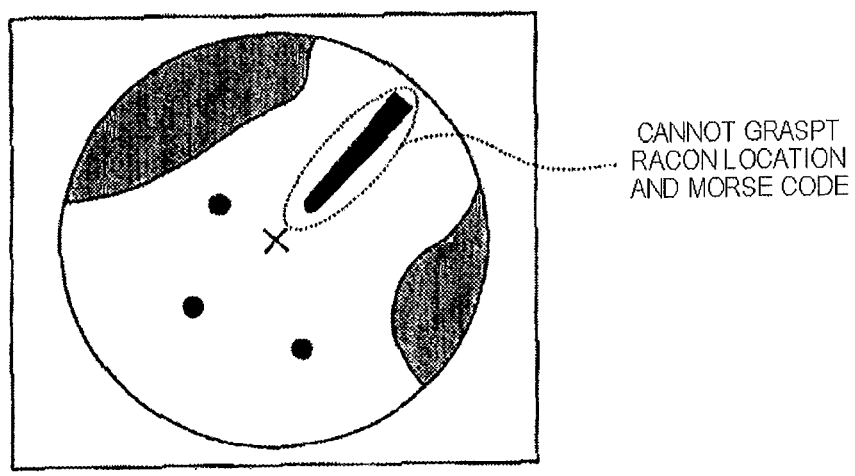

FIGS. 10A and 10B are views showing example indications of the display unit 19 shown in FIG. 2. In a PPI screen 19a shown in FIG. 10A, a radar image including lands 19b and other ships 19c is drawn based on the radar echoes, and the racon mark 30 indicating a shape of the racon is drawn based on the racon response wave. With the racon mark 30 displayed, a radar operator can recognize the location of the racon even without the racon identification code.

Moreover, in the PPI screen 19a shown in FIG. 10B, a radar image including a land 19b and other ships 19c based on the radar echoes is drawn, and a racon 19d and a Morse code 19e are drawn on it based on the racon response wave. The Morse code 19e is controlled to be displayed within a hollow frame as shown in FIG. 10B. Therefore, even if the indication of the Morse code overlaps with the locations of the other ships, since the locations of the other ships can be displayed within the frame of the Morse code, the problem that the locations of other ships are hidden by the Morse code can be solved.

Note that, in this embodiment, the case where the racon response wave at the frequency (f1-Δf) is transmitted when the radar classification of the radar transceiver 10 is the pulse compression radar is described; however, not limiting to this, as long as the radar echo and the racon response wave can be separated, the racon response wave can be transmitted at an arbitrary frequency.

Moreover, in this embodiment, the case where the pulse compression radar is used is described as an example; however, not limiting to this, the present invention is also applicable to solid-state radars other than the pulse compression radar. Furthermore, in this embodiment, the case where the racon 20 determines the radar classification of the radar transceiver 10 by using at least one of the pulse width and the frequency of the radar pulse contained in the radar wave is described; not limiting to this, the present invention is applicable to when the radar transceiver 10 informs the radar classification to the racon 20 in a different method.

Further, in this embodiment, the case where the present invention is applied to the ship radar system is described; however, not limiting to this, the present invention is also applicable to other radar systems, such as a radar system for airplanes.

As described above, the radar system, the transponder device, the method for the radar processing, and the radar processing program according to the present invention are suitable in controlling to appropriately and efficiently display other movable bodies and/or transponder devices on the display unit when the solid-state radar is adopted in the radar transceiver.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A radar system, comprising:
   a radar transceiving device equipped in a movable body and for transmitting an electromagnetic wave at a first frequency; and
   a transponder device arranged in a beacon and for transmitting a response wave upon receiving the electromagnetic wave at the first frequency,
   wherein the transponder device includes a response wave transmitting module for transmitting, when a radar classification of the radar transceiving device is a solid-state radar, a response wave at a second frequency different from the first frequency in response to receiving the electromagnetic wave transmitted from the radar transceiving device, and
   wherein the radar transceiving device includes:
      a transmitting module for transmitting the electromagnetic wave at the first frequency;
      a receiving module for receiving a radar echo at the first frequency and the response wave at the second frequency; and
      a display controlling module for controlling to display, on a predetermined radar display unit, locations of at least the beacon and another movable body existing around the movable body based on the radar echo and the response wave.

2. The radar system of claim 1, wherein the response wave transmitting module includes a determining module for determining, when receiving the electromagnetic wave transmitted from the radar transceiving device, whether the radar classification of the radar transceiving device is the solid-state radar based on at least one of a pulse width and the frequency of the electromagnetic wave.

3. The radar system of claim 2, wherein the response wave transmitter further including:
   a transmission frequency setting module for setting on a predetermined transceiver, when the radar classification of the radar transceiving device is determined to be the solid-state radar by the determining module, the second frequency shifted from the first frequency by a predetermined frequency;
   a response waveform generating module for generating a response waveform obtained by modulating a predetermined signal series using a predetermined modulation scheme, and outputting the response waveform to the transceiver; and
   a transmission trigger generating module for generating a transmission trigger of the response waveform after a predetermined period of time from a falling edge or a rising edge of a radar pulse contained in the electromagnetic wave and outputting the transmission trigger to the transceiver, and
   wherein the transceiver frequency-converts the signal with the response waveform into the second frequency, and outputs the converted response waveform to a predetermined antenna unit at a timing corresponding to the generated transmission trigger.

4. The radar system of claim 3, wherein the predetermined signal series indicates that the response wave is from the transponder device.

5. The radar system of claim 3, wherein the response waveform is generated by modulating a signal series that is the predetermined signal series added with arbitrary information, the predetermined signal series indicating that the response wave is from the transponder device.

6. The radar system of claim 1, wherein the display controlling module controls to display a signal series contained in the response wave received by the receiving module in the form of a hollow frame.

7. The radar system of claim 1, wherein the response wave at the first frequency is transmitted when the radar classification of the radar transceiving device is not the solid-state radar.

8. A transponder device arranged in a beacon and for transmitting a response wave upon receiving an electromagnetic wave at a first frequency, comprising:
   a determining module for determining, when receiving the electromagnetic wave at the first frequency, whether the electromagnetic wave at the first frequency is transmitted from a solid-state radar; and
   a response wave transmitting module for transmitting a response wave at a second frequency different from the first frequency when the electromagnetic wave at the first frequency is determined to be transmitted from the solid-state radar by the determining module.

9. A method for radar processing in a radar system including a radar transceiving device equipped in a movable body and for transmitting an electromagnetic wave at a first frequency, and a transponder device arranged in a beacon and for transmitting a response wave upon receiving the electromagnetic wave at the first frequency, the method comprising:
   transmitting the electromagnetic wave at the first frequency by the radar transceiving device;
   transmitting by the transponder device, when a radar classification of the radar transceiving device is a solid-state radar, a response wave at a second frequency different from the first frequency in response to receiving the electromagnetic wave transmitted from the radar transceiving device;
   receiving a radar echo at the first frequency and the response wave at the second frequency by the radar transceiving device; and
   controlling to display, on a predetermined radar display unit, locations of at least the beacon and another more movable body existing around the movable body, based on the radar echo and the response wave.

10. Computer readable media configured to store a computer executable program in a non-transitory manner, which upon execution by a processor of a computer causes the computer to perform radar processing on a radar transceiving device equipped in a movable body and for transmitting an electromagnetic wave at a first frequency, and on a transponder device arranged in a beacon and for transmitting a response wave upon receiving the electromagnetic wave at the first frequency, according to a method, comprising:
   causing a computer configuring the transponder device to transmit, when a radar classification of the radar transceiving device is a solid-state radar, a response wave at a second frequency different from the first frequency in response to receiving the electromagnetic wave transmitted from the radar transceiving device; and
   causing a computer configuring the radar transceiving device to transmit the electromagnetic wave at the first frequency, receive a radar echo at the first frequency and the response wave at the second frequency, and control to display, on a predetermined radar display unit, locations of the at least beacon and another movable body existing around the movable body, based on the radar echo and the response wave.

* * * * *